(12) United States Patent
Yutani et al.

(10) Patent No.: US 10,461,655 B2
(45) Date of Patent: Oct. 29, 2019

(54) POWER FLUCTUATION MITIGATION SYSTEM

(71) Applicants: FUJI ELECTRIC CO., LTD., Kanagawa (JP); RIKEN, Saitama (JP)

(72) Inventors: Kouji Yutani, Yamanashi (JP); Hiroyuki Yamano, Kanagawa (JP); Reiri Kin, Tokyo (JP); Toshiyuki Tsukamoto, Saitama (JP)

(73) Assignees: FUJI ELECTRIC CO., LTD., Kawasaki-shi, Kanagawa (JP); RIKEN, Saitama (JP)

( * ) Notice: Subject to any disclaimer, the term of this patent is extended or adjusted under 35 U.S.C. 154(b) by 0 days.

(21) Appl. No.: 15/854,033

(22) Filed: Dec. 26, 2017

(65) Prior Publication Data

US 2018/0123475 A1 May 3, 2018

Related U.S. Application Data (63) Continuation of application No. PCT/JP2017/002474, filed on Jan. 25, 2017.

(30) Foreign Application Priority Data

Jan. 28, 2016 (JP) .................... 2016-014532

(51) Int. Cl.
*H02M 7/48* (2007.01)
*H01M 10/44* (2006.01)
(Continued)

(52) U.S. Cl.
CPC ............ *H02M 5/458* (2013.01); *G05F 1/66* (2013.01); *H01M 10/44* (2013.01); *H02J 3/32* (2013.01);
(Continued)

(58) Field of Classification Search
CPC ........... G05F 1/66; H01M 10/44; H02M 7/48; H02M 7/06; H02M 5/40; H02M 5/42;
(Continued)

(56) References Cited

U.S. PATENT DOCUMENTS

| 9,618,953 | B2 | 4/2017 | Tsunoda et al. | |
|---|---|---|---|---|
| 2006/0006855 | A1* | 1/2006 | Feng | H02M 3/07 323/282 |

(Continued)

FOREIGN PATENT DOCUMENTS

| JP | H05-161282 | 6/1993 |
|---|---|---|
| JP | H09-285135 | 10/1997 |

(Continued)

OTHER PUBLICATIONS

Extended European search report dated Apr. 19, 2018 issued with respect to the corresponding European Patent Application No. 17744240.7.

(Continued)

*Primary Examiner* — Gustavo A Rosario-Benitez
(74) *Attorney, Agent, or Firm* — IPUSA, PLLC (57) ABSTRACT

A power fluctuation mitigation system for use in a power supply system that supplies AC power to a load includes an inverter unit including a first converter connected to an AC power supply to perform DC/AC conversion, a DC intermediate condenser, and an inverter connected to the first converter through the DC intermediate condenser to perform DC/AC conversion, and a power fluctuation mitigating device including a second converter connected to the AC power supply to perform AC/DC conversion, a capacitive storage device configured to be charged by an output of the second converter, and a charging unit to charge the DC intermediate condenser with power stored in the capacitive storage device, wherein the charging unit supplies power (Continued)

from the capacitive storage device to the DC intermediate condenser upon occurrence of fluctuation in an output of the inverter unit occurring in response to fluctuation in the load.

5 Claims, 7 Drawing Sheets

(51) Int. Cl.
*H02J 3/32* (2006.01)
*H02J 7/34* (2006.01)
*H02M 5/45* (2006.01)
*H02M 5/458* (2006.01)
*G05F 1/66* (2006.01)
*H02M 7/06* (2006.01)
*H02M 5/42* (2006.01)
*H02J 3/38* (2006.01)
*H02M 11/00* (2006.01)

(52) U.S. Cl.
CPC ............... *H02J 7/345* (2013.01); *H02M 7/06* (2013.01); *H02J 3/382* (2013.01); *H02M 5/42* (2013.01); *H02M 7/48* (2013.01); *H02M 11/00* (2013.01)

(58) Field of Classification Search
CPC ........ H02M 5/458; H02M 5/4585; H02J 3/32; H02J 7/345; H02J 3/382; H02J 3/28; H02J 3/36; H02J 3/38; H02J 7/02; H02J 7/34
See application file for complete search history.

(56) References Cited

U.S. PATENT DOCUMENTS

| | | | |
|---|---|---|---|
| 2007/0029881 A1 | 2/2007 | Lai | |
| 2011/0007530 A1* | 1/2011 | Swamy | H02M 1/36 363/37 |
| 2013/0111252 A1* | 5/2013 | Yoshida | G06F 1/30 713/340 |
| 2013/0184884 A1* | 7/2013 | More | F03D 7/0284 700/291 |
| 2013/0208515 A1* | 8/2013 | Swamy | H02M 1/36 363/37 |
| 2015/0008671 A1* | 1/2015 | Palomares Rentero | H02J 9/062 290/44 |
| 2015/0117073 A1 | 4/2015 | Flett | |
| 2015/0180273 A1 | 6/2015 | Wagoner et al. | |
| 2015/0222207 A1* | 8/2015 | Matsushita | B66F 9/02 318/376 |
| 2015/0244282 A1* | 8/2015 | Yamashita | H02M 1/4225 363/35 |
| 2017/0207638 A1* | 7/2017 | Kawamura | H02J 7/0021 |

FOREIGN PATENT DOCUMENTS

| | | |
|---|---|---|
| JP | 2003-224978 | 8/2003 |
| JP | 2009-077604 | 4/2009 |
| JP | 4932653 | 5/2012 |
| JP | 2015-109781 | 6/2015 |
| JP | 5816288 | 11/2015 |

OTHER PUBLICATIONS

Office Action dated Oct. 5, 2018 issued with respect to the corresponding European Patent Application No. 17744240.7.
Office Action dated Aug. 1, 2018 issued with respect to the corresponding Patent Application No. 17744240.7.

* cited by examiner

POWER FLUCTUATION MITIGATION SYSTEM

CROSS-REFERENCE TO RELATED APPLICATIONS

This application is a continuation application of International Application PCT/JP2017/002474, filed on Jan. 25, 2017 and designated the U.S., which is based upon and claims the benefit of priority from the prior Japanese Patent Application No. 2016-014532 filed on Jan. 28, 2016, with the Japanese Patent Office. The entire contents of these applications are incorporated herein by reference.

BACKGROUND OF THE INVENTION

1. Field of the Invention

The disclosures herein relate to a power fluctuation mitigation system.

2. Description of the Related Art

A grid stabilization system disclosed in Patent Document 1 is known in the art as a related-art technology for stabilizing and mitigating power fluctuation in an AC power distribution grid.

Figure 8:
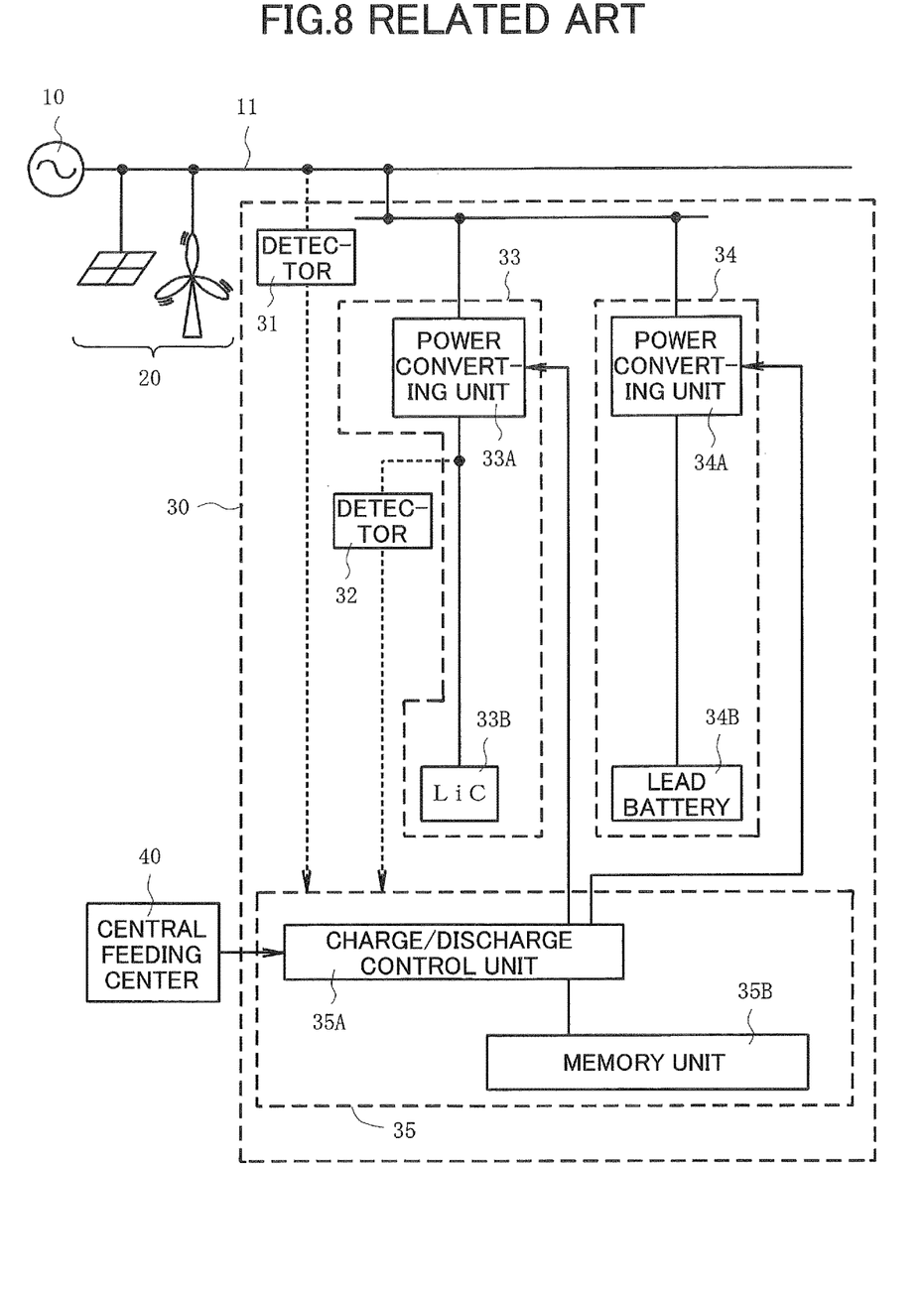
FIG. 8 is a drawing illustrating the entire configuration of a related-art technology disclosed in Patent Document 1.

FIG. 8 is a drawing illustrating the entire configuration of such a grid stabilization system. FIG. 8 shows an AC power supply 10, a power distribution grid 11, a power generating facility 20 utilizing renewable energy such as a solar power generation device or a wind power generation device, a grid stabilization system 30, a frequency detector 31, a power detector 32, a capacitor device 33 including a power converting unit 33A and a lithium ion capacitor (LiC) 33B, an electric storage device 34 including a power converting unit 34A and a lead battery 34B, a control device 35 including a charge/discharge control unit 35A and a memory unit 35B, and a central feeding center 40.

The related-art illustrated in FIG. 8 has an objective to mitigate power fluctuation on the power distribution grid 11 occurring due to changes in the power level generated by the power generating facility 20. A particular objective is to reduce the number of charge and discharge cycles of the lead battery 34B by giving priority to the charging and discharging of lithium ion capacitor 33B so as to prevent the degradation of the lead battery 34B.

A specific operation for mitigating power fluctuation is based on the knowledge that power fluctuation is accompanied with frequency fluctuation. When a detection value indicative of grid frequency produced by the frequency detector 31 exhibits fluctuation, the charge/discharge control unit 35A uses the power converting unit 33A to give priority to the charging and discharging of the lithium ion capacitor 33B, thereby controlling the power supplied to (fed into) the power distribution grid 11 to suppress power fluctuation. In the case of the charging and discharging of the lithium ion capacitor 33B alone being not sufficient to effectively suppress fluctuation, the charge/discharge control unit 35A utilizes the power converting unit 34A to control the charging and discharging of the lead battery 34B, thereby complementing the operation of suppressing power fluctuation.

This arrangement serves to reduce the frequency of charge and discharge of the lead battery 34B, for which the number of times charging and discharging can be performed is significantly lower than in the case of the lithium ion capacitor 33B, thereby preventing the degradation of the lead battery 34B to prolong the life of the system.

Figure 9:
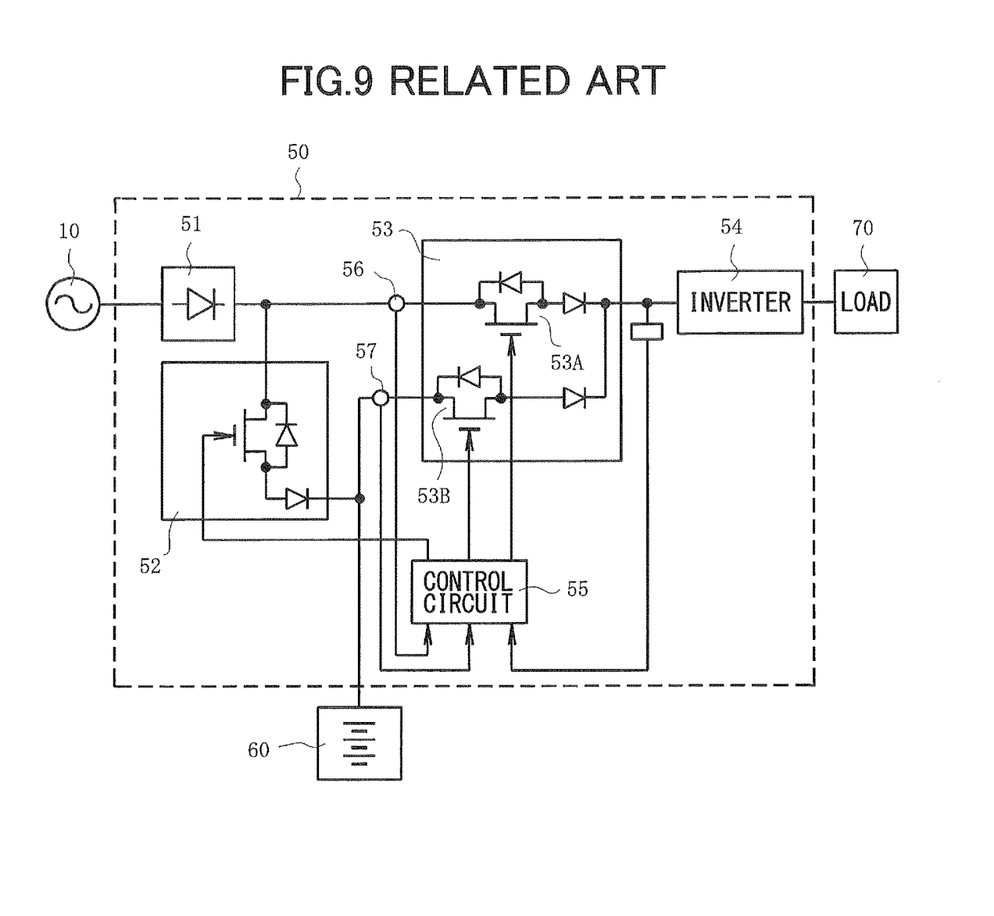
FIG. 9 is a drawing illustrating the entire configuration of a related-art technology disclosed in Patent Document 2.

FIG. 9 is a drawing illustrating the entire configuration of a power supply system of an AC input leveling type as disclosed in Patent Document 2.

FIG. 9 shows the AC power supply 10, an input-leveling-type power supply device 50, a converter 51, a charging circuit 52, a synthesizing circuit 53, switching elements 53A and 53B, an inverter 54, a control circuit 55, current measuring devices 56 and 57, a secondary battery 60, and a load 70.

This power supply system of an AC input leveling type properly controls the ratio of synthesis of the DC power produced by the AC power supply 10 to the DC power produced by the secondary battery 60 by driving the switching elements 53A and 53B of the synthesizing circuit 53, thereby enabling the facility having a secondary battery with a minimum capacity to reduce power fluctuation even when the load 70 fluctuates depending on the hour. A stable operation of the load 70 and the reduction of peak current are thus enabled.

In the related-art technologies illustrated in FIG. 8 and FIG. 9, reducing the frequency of charge and discharge of a secondary battery to a minimum enables the reduction of speed at which the secondary battery degrades.

Regularly performed maintenance and inspection work, however, is indispensable as long as a secondary battery is used. Instruments, personnel, labor, time, etc., required for this work impose a heavy burden, for which a solution needs to be addressed.

Accordingly, it may be desirable to provide a power fluctuation mitigation system that promptly reduces power fluctuation on the AC power supply side caused by sudden changes of the load or the like and that is made to be maintenance free to reduce the burden of maintenance and inspection.

RELATED-ART DOCUMENTS

Patent Document

[Patent Document 1] Japanese Patent No. 5816288
[Patent Document 2] Japanese Patent No. 4932653

SUMMARY OF THE INVENTION

According to an embodiment, a power fluctuation mitigation system for use in a power supply system that supplies AC power to a load includes an inverter unit including a first converter connected to an AC power supply to perform DC/AC conversion, a DC intermediate condenser, and an inverter connected to the first converter through the DC intermediate condenser to perform DC/AC conversion, and a power fluctuation mitigating device including a second converter connected to the AC power supply to perform AC/DC conversion, a capacitive storage device configured to be charged by an output of the second converter, and a charging unit to charge the DC intermediate condenser with power stored in the capacitive storage device, wherein power is supplied from the capacitive storage device to the DC intermediate condenser through the charging unit upon occurrence of fluctuation in an output of the inverter unit occurring in response to fluctuation in the load.

According to an embodiment, a power fluctuation mitigation device, for use in a power supply system that supplies AC power to a load through an inverter unit including a first converter connected to an AC power supply to perform DC/AC conversion, a DC intermediate condenser, and an inverter connected to the first converter through the DC intermediate condenser to perform DC/AC conversion, includes a second converter to be connected to the AC power supply and configured to perform AC/DC conversion, a capacitive storage device configured to be charged by an output of the second converter, and a charging unit configured to charge the DC intermediate condenser with power stored in the capacitive storage device, wherein the charging unit supplies power from the capacitive storage device to the DC intermediate condenser upon occurrence of fluctuation in an output of the inverter unit occurring in response to fluctuation in the load.

DESCRIPTION OF THE PREFERRED EMBODIMENTS

In the following, embodiments of the present invention will be described with reference to the accompanying drawings.

Figure 1:
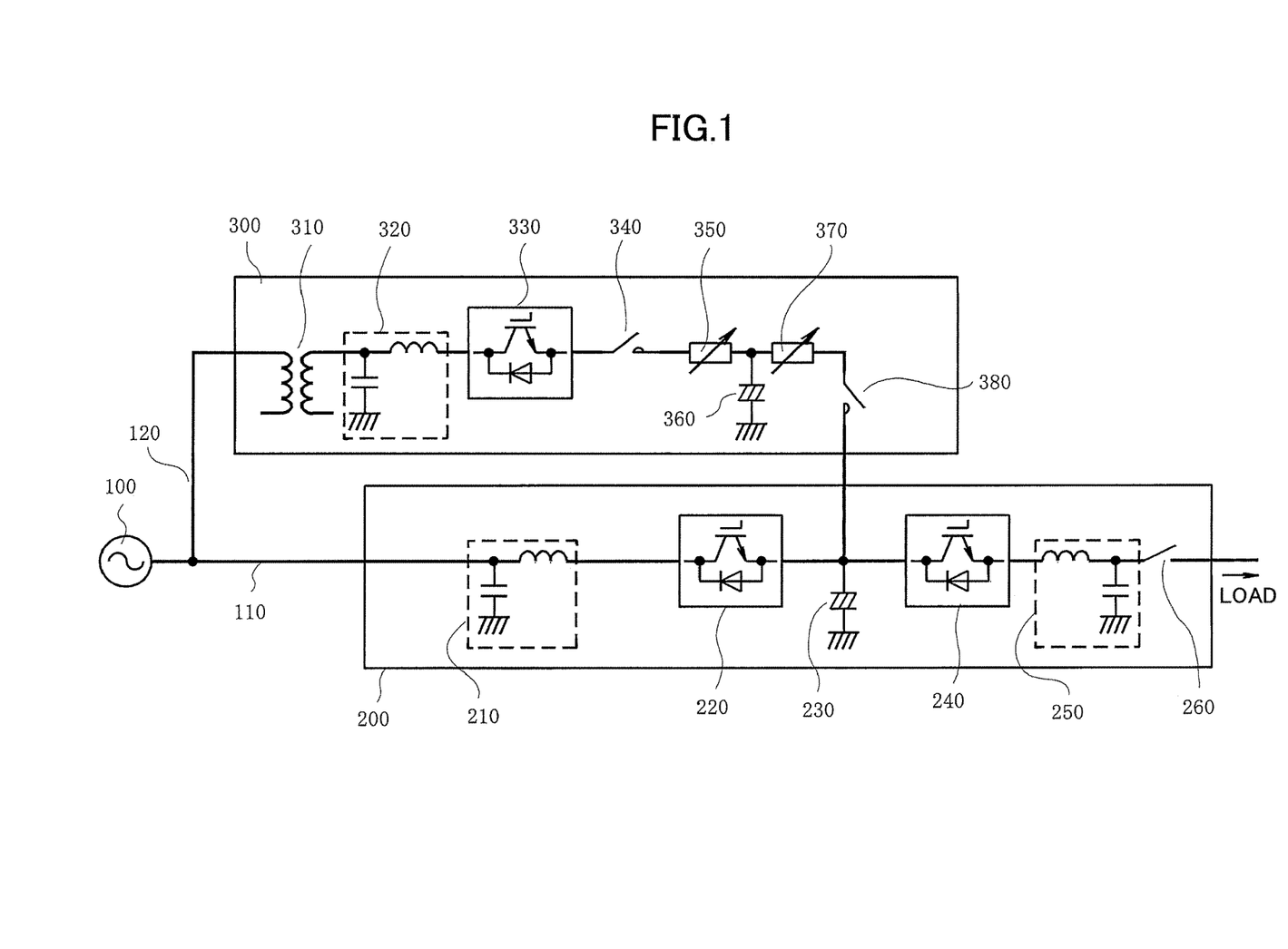
FIG. 1 is a drawing illustrating the configuration of a power fluctuation mitigation system according to an embodiment.

FIG. 1 is a drawing illustrating the configuration of a power fluctuation mitigation system according to an embodiment. In FIG. 1, an AC power supply 100 is connected through a power distribution line 110 to an inverter unit 200, the output end of which is connected to a load (not shown).

The inverter unit 200, which has a general configuration and function to perform AC/DC/AC conversion with respect to AC input voltage for provision to the load, includes a filter 210 at the input end, a first converter 220 connected to the output end of the filter 210, an inverter 240 connected to the DC side of the first converter 220 through a DC intermediate condenser 230, a filter 250 on the output side, and an output switch 260.

The circuit configuration of the first converter 220 and the inverter 240 is not limited to a particular configuration, and suffices as long as AC/DC conversion or DC/AC conversion is performable through the operations of semiconductor switching devices and as long as the entirety thereof serves as an inverter unit performing DC/AC/DC conversion through the first converter 220, the DC intermediate condenser 230, and the inverter 240. The system for controlling the first converter 220 and the inverter 240 are also not limited to a particular system. The present embodiment employs as an example the system that controls a PWM converter and a PWM inverter 240.

A branch line 120 branching off the power distribution line 110 is connected to a power fluctuation mitigation device 300. The power fluctuation mitigation device 300 includes a transformer 310 having a primary side connected to the branch line 120, a filter 320 connected to the secondary side of the transformer 310, a second converter 330 connected to the output end of the filter 320, variable resistors 350 and 370 series-connected to the output end of the second converter 330 through a control switch 340, a large-volume capacitor 360 serving as a capacitive storage element connected between the ground (i.e., frame ground) and the connection point between the variable resistors 350 and 370, and a control switch 380 situated between the variable resistor 370 and one end of the previously noted DC intermediate condenser 230.

In the above-noted configuration, the variable resistor 370 and the control switch 380 constitute a charging unit recited in the claims.

The circuit configuration and control system of the second converter 330 are not limited to a particular example. Similarly to the previously noted configuration, the present embodiment employs as an example the system that controls a PWM converter.

The DC intermediate condenser 230 of the inverter unit 200 may be implemented as an electrolytic condenser, for example.

The capacitor 360 serving as a capacitive storage element in the power fluctuation mitigation device 300 may be implemented as a lithium ion capacitor (LiC) or an electric double layer capacitor, for example. In place of these capacitors, a large-volume electrolytic condenser may be used as this capacitive storage element.

In the power fluctuation mitigation device 300, the control switches 340 and 380 may not be provided, and the points corresponding to the two ends of each of these switches 340 and 380 may be directly connected to each other. The filters 210 and 250 in the inverter unit 200 and the transformer 310 and the filter 320 in the power fluctuation mitigation device 300 are not essential for the purpose of the present invention.

Figure 2:
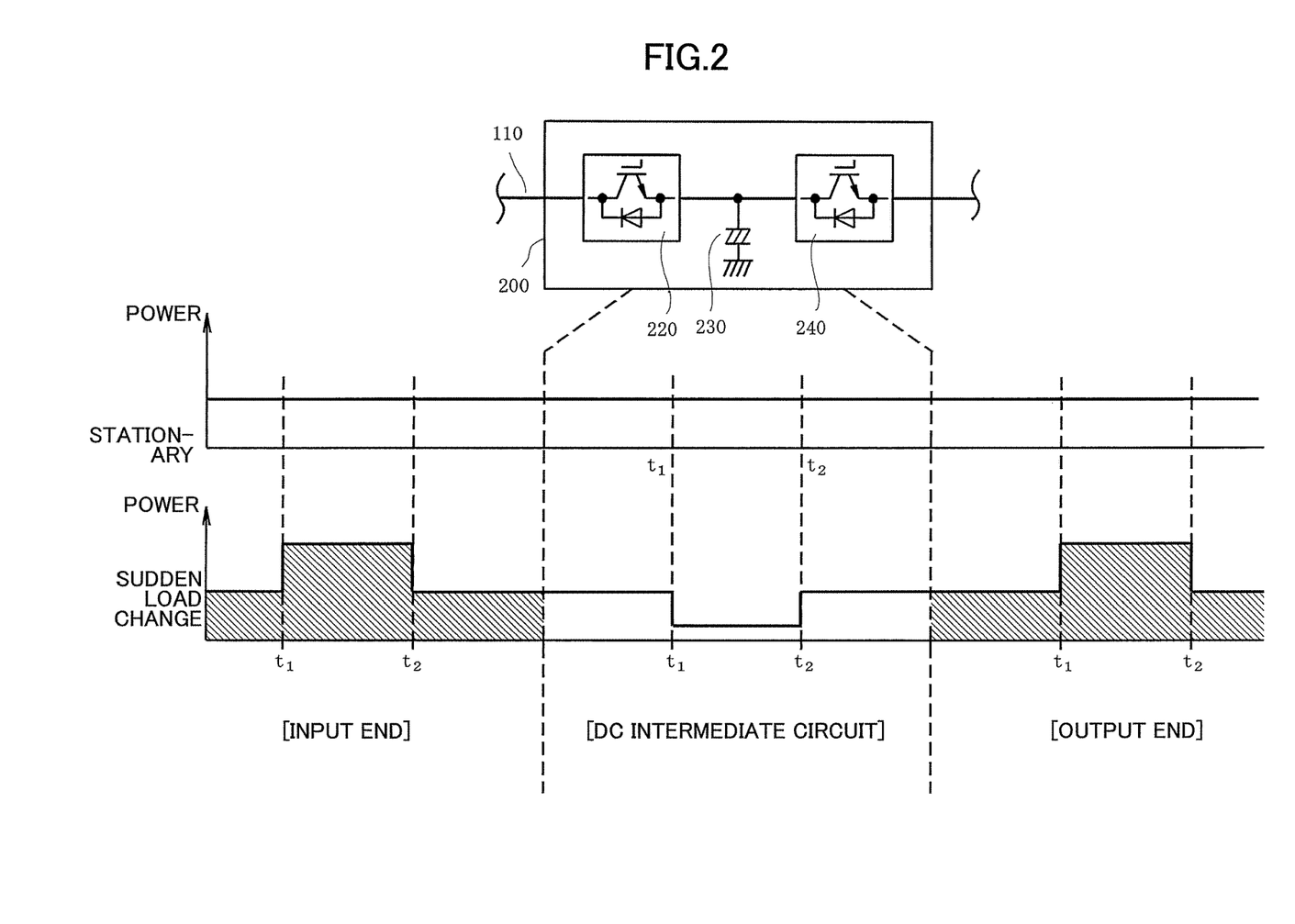
FIG. 2 is a drawing schematically illustrating power conditions observed at a DC intermediate circuit, at an input end, and at an output end of an inverter unit for both the case of a stationary condition and the case of sudden load changes when no power fluctuation mitigation device is provided.

In the following, the configuration in which only the inverter unit 200 is connected to the power distribution line 110 will be discussed before describing the operation of the present embodiment. FIG. 2 is a drawing schematically illustrating power conditions observed at the DC intermediate circuit, input end, and output end of the inverter unit 200 for both the case of a stationary condition and the case of sudden load changes. The illustration of the inverter unit 200 in FIG. 2 shows only the main parts thereof for the sake of convenience.

As illustrated in FIG. 2, in the case of a stationary condition with a constant load, power levels at the DC intermediate circuit, at the input end, and at the output end of the inverter unit 200 are substantially equal to each other when the internal loss in the inverter unit 200 is disregarded.

In contrast, an increase in the power at the output end of the inverter unit 200 between time $t_1$ and time $t_2$ as illustrated in FIG. 2 due to a sudden change in the load causes the DC intermediate condenser 230 to discharge to provide for this power increase, resulting in a power decrease in the DC intermediate condenser. Power at the input end then increases in order to compensate for this decrease from the input side of the inverter unit 200. Namely, a sudden load change occurring between time $t_1$ and time $t_2$ causes the power fluctuation at the output end to appear simultaneously with substantially the same form as power fluctuation at the input end.

Figure 3:
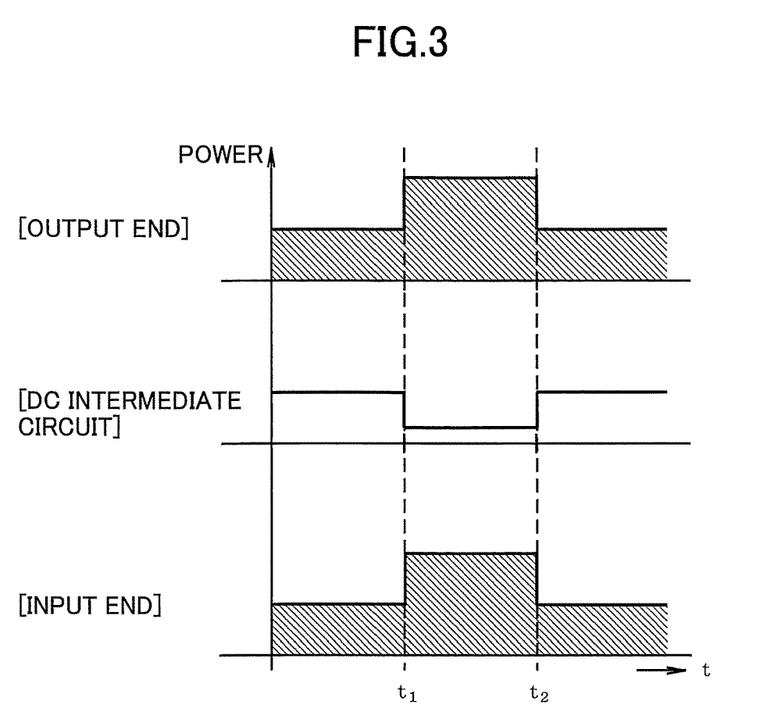
FIG. 3 is a drawing obtained by rewriting and aligning time axes of the power conditions of respective points illustrated in FIG. 2.

The time charts illustrated in FIG. 2 may be aligned in the time dimension to provide a chart illustrated in FIG. 3.

As described above, the configuration in which only the inverter unit 200 supplies power to the load allows a sudden load change to appear simultaneously as power fluctuation on the input side.

Figure 4:
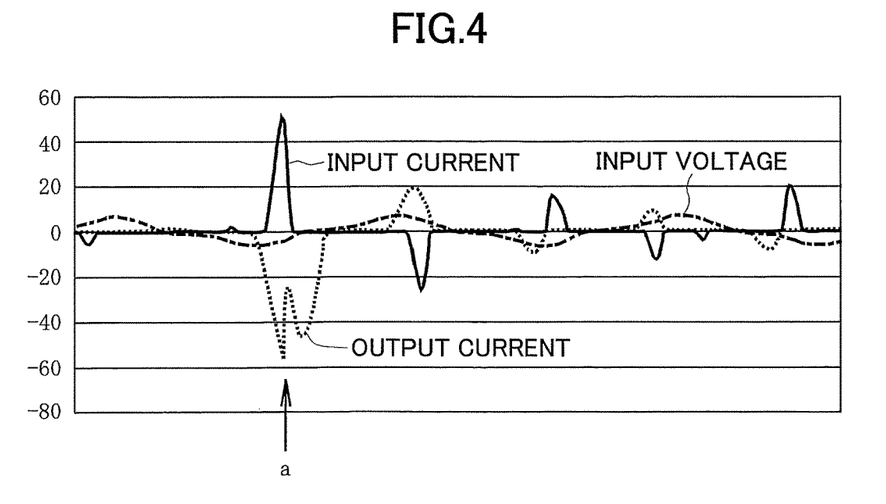
FIG. 4 is a waveform diagram illustrating the results of measuring an output current, an input current, and an input voltage when a sudden load change is simulated by use of a test apparatus including an inverter unit and a dummy load.

FIG. 4 illustrates the results of measuring the output current, input current, and input voltage of an inverter unit when a test apparatus comprised of the inverter unit and a dummy load is used and a sudden change is made to the output current in order to simulate a sudden load change.

As is clearly shown in FIG. 4, the input current changes almost simultaneously with a sudden change in the output current (i.e., the point "a" of the waveform), which means that large power fluctuation occurs on the grid side at the time of a sudden load change.

In the following, the operation of the embodiment will be described by referring to FIG. 1 previously described as well as FIG. 5 through FIG. 7 which will be described later.

In this embodiment, the control switch 340 in FIG. 1 is first turned on to charge the capacitor 360 through the second converter 330. The time constant of charging at this time may be set to a desired value by adjusting the variable resistor 350. It may be noted that a voltage $V_{360}$ observed when the capacitor 360 is in the fully charged state is set higher than a maximum voltage $V_{230}$ of the DC intermediate condenser 230 of the inverter unit 200 (i.e., $V_{360} > V_{230}$).

The control switch 380 at the output end is then tuned on after the charging of the capacitor 360 is completed. As a result, the capacitor 360 of the power fluctuation mitigation device 300 provides the DC intermediate condenser 230 of the inverter unit 200 with latent energy that serves to recover voltage at the time of a voltage drop.

Figure 5:
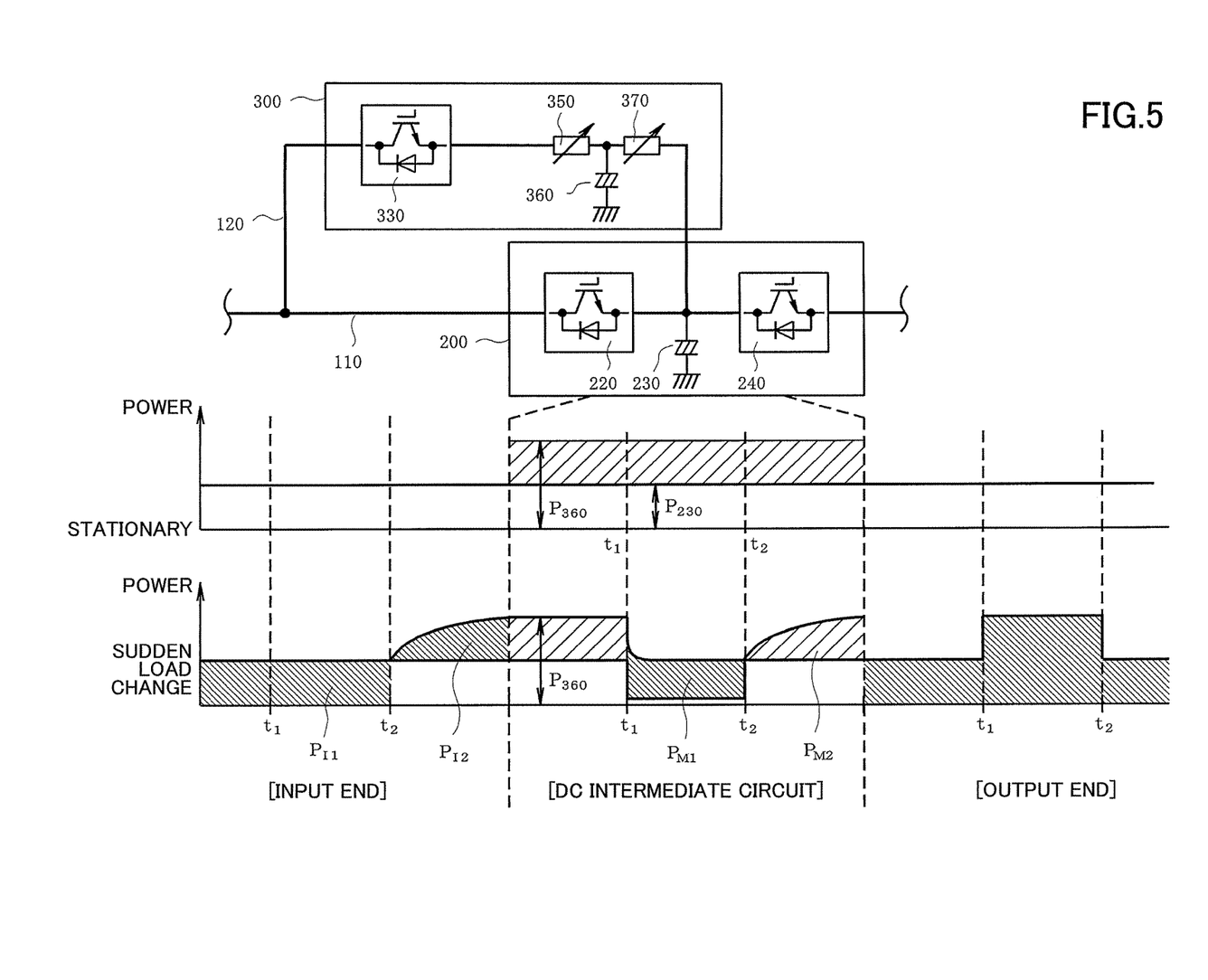
FIG. 5 is a drawing schematically illustrating power conditions observed at the DC intermediate circuit, input end, and output end of the inverter unit for both the case of a stationary condition and the case of sudden load changes in the embodiment.

FIG. 5 is a drawing schematically illustrating power conditions observed at the DC intermediate circuit, input end, and output end of the inverter unit 200 for both the case of a stationary condition and the case of sudden load changes, and corresponds to previously described FIG. 2. It may be noted that the illustration of the inverter unit 200 and the power fluctuation mitigation device 300 in FIG. 5 shows only the main parts thereof for the sake of convenience.

In the case of a stationary condition with a constant load illustrated in FIG. 5, power levels at the DC intermediate circuit, at the input end, and at the output end of the inverter unit 200 are substantially equal to each other as in FIG. 2 when the internal loss in the inverter unit 200 is disregarded. In the time chart of the stationary case illustrated in FIG. 5, $P_{230}$ denotes power held by the DC intermediate condenser 230, and $P_{360}$ denotes power held by the capacitor 360.

An increase in the power at the output end of the inverter unit 200 between time $t_1$ and time $t_2$ as illustrated in FIG. 5 due to a sudden change in the load causes the DC intermediate condenser 230 to discharge to provide for this power increase, resulting in a power decrease in the DC intermediate condenser. In the present embodiment, reduction in the power of the DC intermediate circuit causes the capacitor 360 to discharge immediately to supplement the power of the DC intermediate circuit.

In the time chart of the case of sudden load changes illustrated in FIG. 5, a symbol $P_{M1}$ shown for time $t_1$ to $t_2$ with respect to the DC intermediate circuit indicates the fact that the capacitor 360 compensates for a power decrease of the DC intermediate circuit caused by providing for a power increase at the output end. Further, a symbol $P_{M2}$ shown after time $t_2$ with respect to the DC intermediate circuit indicates the way the DC intermediate condenser 230 is recharged to have power gradually increasing according to the time constant defined by the variable resistor 370 and the DC intermediate condenser 230 in response to the discharging of the capacitor 360.

As described above, the DC intermediate circuit supplements power for a power increase even when the power at the output end increases between time $t_1$ and time $t_2$. As a result, almost no power fluctuation appears at the input end of the inverter unit 200 between time $t_1$ and time $t_2$ as indicated by a symbol $P_{11}$. A symbol $P_{12}$ after time $t_2$ indicates a power increase caused by the first converter 220 of the inverter unit 200 charging in a complementing manner the DC intermediate condenser 230

Figure 6:
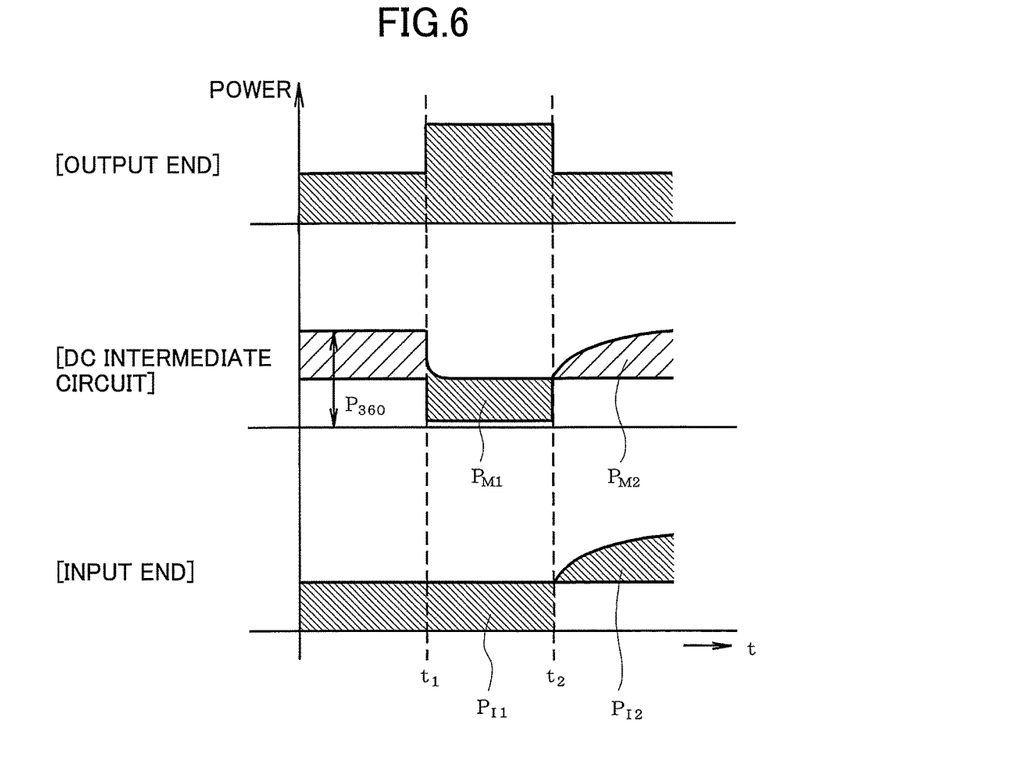
FIG. 6 is a drawing obtained by rewriting and aligning time axes of the power conditions of respective points illustrated in FIG. 5.

The time charts illustrated in FIG. 5 may be aligned in the time dimension to provide a chart illustrated in FIG. 6.

The time constant of charging the DC intermediate condenser 230, i.e., the sensitivity for mitigating power fluctuation in the present embodiment, may be set to any value by adjusting the variable resistor 370 according to the condition of load fluctuation (e.g., the magnitude, frequency, intervals of fluctuation).

Figure 7:
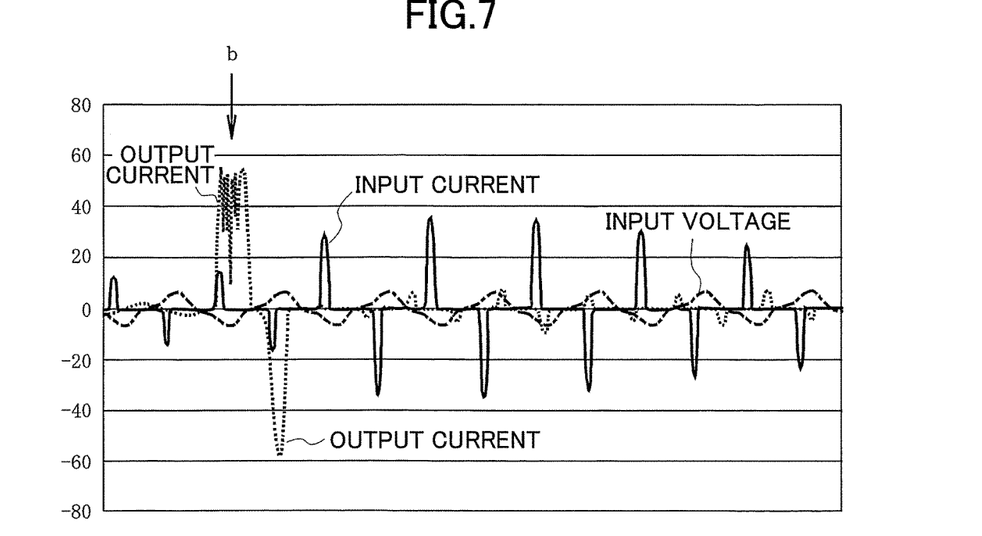
FIG. 7 is a waveform diagram illustrating the results of measuring an output current, an input current, and an input voltage when a sudden load change is simulated by use of a test apparatus corresponding to the embodiment.

FIG. 7 shows the results of measuring the output current, the input current, and the input voltage of an inverter unit (corresponding to the inverter unit 200 illustrated in FIG. 1) when a test apparatus corresponding to the power fluctuation mitigation system of the present embodiment is used and a sudden change is made to the output current for simulating a sudden load change. FIG. 7 corresponds to previously described FIG. 4.

As is understood from FIG. 7, the occurrence of a sudden change in the output current (i.e., the point "b" in the waveform) does not bring about a sudden change in the input current, which means that power fluctuation on the grid side is reduced at the time of a sudden load change.

According to the present embodiment, in the case of the occurrence of fluctuation in the load of the inverter unit, power compensating for such fluctuation is immediately supplied from the capacitive storage device of the power fluctuation mitigation device to the DC intermediate circuit of the inverter unit. This arrangement is able to reduce and mitigate power fluctuation on the power distribution grid on the AC power supply side without the risk of allowing the power fluctuation at the output end of the inverter unit to spread to the input end.

Unlike the control system that reduces power fluctuation by charging and discharging a secondary battery as in the related-art technologies, instruments, personnel, labor, etc. for the maintenance and inspection of a secondary battery can be reduced to enable maintenance free, and the entire system can be made to have a prolonged life.

The present invention is at least applicable to various types of power supply systems, power feed systems, and the like that supply AC power to a load by use of an inverter unit having a DC intermediate circuit.

Further, the present invention is not limited to these embodiments, but various variations and modifications may be made without departing from the scope of the present invention.

What is claimed is:

1. A power fluctuation mitigation system for use in a power supply system that supplies AC power to a load, comprising:
   an inverter unit including a first converter connected to an AC power supply to perform AC/DC conversion, a DC intermediate condenser, and an inverter connected to the first converter through the DC intermediate condenser to perform DC/AC conversion; and
   a power fluctuation mitigating device including a second converter connected to the AC power supply to perform AC/DC conversion, a first variable resistor, a capacitive storage device configured to be charged by an output of the second converter through the first variable resistor, and a charging unit including a second variable resistor to charge the DC intermediate condenser through the second variable resistor with power stored in the capacitive storage device, wherein a voltage of the capacitive storage device in a fully charged state is set higher than a maximum voltage of the DC intermediate condenser,
   wherein the charging unit supplies power from the capacitive storage device to the DC intermediate condenser upon occurrence of fluctuation in an output of the inverter unit occurring in response to fluctuation in the load.

2. The power fluctuation mitigation system as claimed in claim 1, wherein the second variable resistor is connected between one end of the capacitive storage device and one end of the DC intermediate condenser.

3. The power fluctuation mitigation system as claimed in claim 2, wherein a control switch for charging the DC intermediate condenser is placed between the capacitive storage device and the DC intermediate condenser and connected in series with the second variable resistor.

4. The power fluctuation mitigation system as claimed in claim 1, wherein the capacitive storage device is a capacitor or an electrolytic condenser.

5. A power fluctuation mitigation device for use in a power supply system that supplies AC power to a load through an inverter unit including a first converter connected to an AC power supply to perform AC/DC conversion, a DC intermediate condenser, and an inverter connected to the first converter through the DC intermediate condenser to perform DC/AC conversion, the power fluctuation mitigation device comprising:
   a second converter to be connected to the AC power supply and configured to perform AC/DC conversion;
   a first variable resistor;
   a capacitive storage device configured to be charged by an output of the second converter through the first variable resistor, wherein a voltage of the capacitive storage device in a fully charged state is set higher than a maximum voltage of the DC intermediate condenser; and
   a charging unit including a second variable resistor configured to charge the DC intermediate condenser through the second variable resistor with power stored in the capacitive storage device,
   wherein the charging unit supplies power from the capacitive storage device to the DC intermediate condenser upon occurrence of fluctuation in an output of the inverter unit occurring in response to fluctuation in the load.

* * * * *